UNITED STATES PATENT OFFICE.

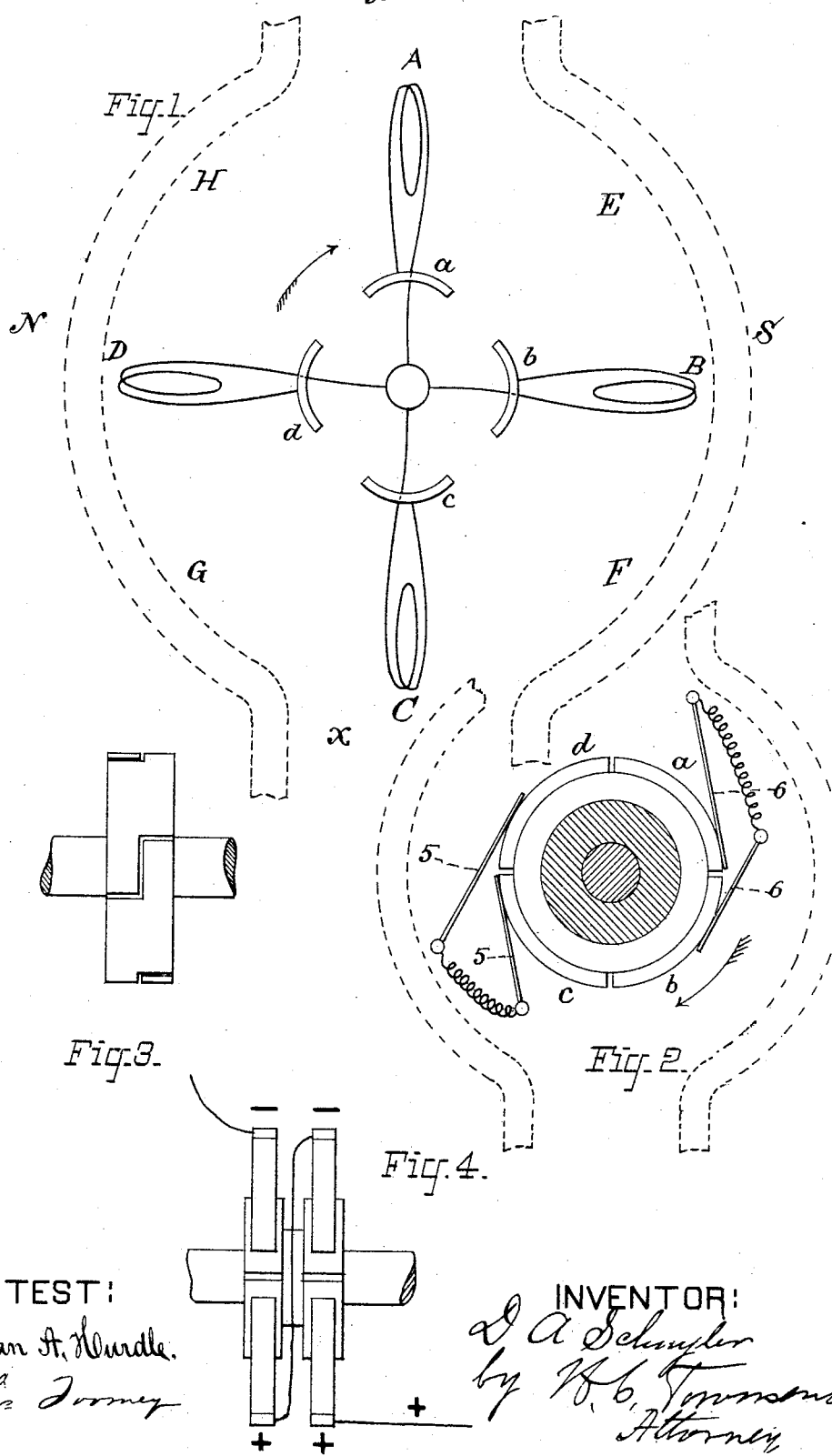

DANIEL A. SCHUYLER, OF NEW YORK, N. Y.

DYNAMO-ELECTRIC MACHINE.

SPECIFICATION forming part of Letters Patent No. 261,390, dated July 18, 1882.

Application filed December 27, 1881. (No model.)

*To all whom it may concern:*

Be it known that I, DANIEL A. SCHUYLER, a citizen of the United States, residing at New York, in the county and State of New York, have invented certain new and useful Improvements in Dynamo-Electric Machines, of which the following is a specification.

My invention consists in a novel arrangement of the armature-coils in a dynamo-electrical machine and a new plan of connecting the coils to one another and to the commutating devices of the machine.

The exact nature of my invention will be readily understood from the annexed description and drawings.

I propose in carrying out the invention to divide the armature coils or helices into sets of four, the coils of each set being disposed symmetrically with relation to one another in such a way that each coil is placed at an angle of ninety degrees to the coils of the same set upon either side of it and diametrically opposite to the remaining coil of the set. If the armature contain eight bobbins or coils, there would be two sets of coils of four bobbins each, and the bobbins or helices of one set would be placed between bobbins or helices of the other. If the armature be divided into twelve bobbins, its bobbins would be arranged in three sets, and any three contiguous bobbins would belong each to a separate set or group; but in every case the bobbins of each group would be spaced and disposed with relation to one another in the manner already described. Each set or group is provided with a separate commutator ring or cylinder, and one end of each helix or bobbin in a set is connected to a separate plate or segment of the commutator. With the arrangement of field-of-force poles herein indicated diametrically-opposite bobbins would be connected to diametrically-opposite segments. The remaining ends are bunched or in permanent electrical connection with one another. Commutator-brushes are so applied, or the segments of the commutator are of such length, that each bobbin or helix is connected to the commutator-brush during the greater part of its movement from one neutral point to another of the magnetic field, and if the magnetic field be formed by two curved pole-pieces only, placed diametrically opposite, each coil or helix would be connected to the outside circuit through approximately one hundred and thirty-five degrees (more or less) of its revolution, and would be disconnected from the commutator-brushes entirely as it approaches the point where the polarity of the current generated in it is reversed—that is, as it approaches the neutral point.

The armature-coils may consist of any desired number of bobbins that is capable of division by the factor 4. I have found, however, that excellent results are attained, when the form of machine having two field-of-force poles is employed, by dividing the armature into two sets of bobbins or helices of four each and connecting the two sets, in the manner described, to two independent commutator rings or cylinders, each having the ordinary positive and negative collecting-brushes.

In the accompanying drawings, Figure 1 illustrates diagrammatically my invention. Fig. 2 shows an end view of one form of a commutator-cylinder with brushes applied thereto, so as to preserve the continuity of the circuit and to preserve the connection of a segment or plate of the commutator with the outside circuit during the time that the coil with which it is connected is generating useful current or is passing from one neutral portion of the field to the other. As here shown, connection is preserved through about one hundred and forty degrees of revolution of the armature-coil. Fig. 3 shows an equivalent arrangement for preserving the connection and preventing break of contact as the brushes shift from one plate to another. Fig. 4 shows the method of connecting up the brushes of the separate commutator-cylinders for producing intensity effects.

Referring to Fig. 1, A B C D represent four bobbins or helices of a revolving armature, and *a b c d* commutator plates or segments, to which the same ends of the bobbins are connected, as indicated. The remaining or free ends of the bobbins are joined together in one common electrical connection. The bobbins A B C D are disposed symmetrically, and occupy positions upon their carrier at angles of ninety degrees from one another. The bobbins A C are diametrically opposite one another, and so also are the bobbins B D. These bobbins are supposed to revolve in the ordinary way between curved pole-pieces, (indicated by the letters N S,) so that the single bobbin, or the two contiguous bobbins which are at any time to the right of the line X X, will be generating current of one polarity, while the bobbin or bobbins on the other side will be generating current of the opposite polarity. If the armature contained eight independent bobbins, and were divided, as I propose, into two sets of four each, the remaining bobbins would be located symmetrically with relation to one another and to the bobbins A B C D, and would occupy the positions E F G H. They would be in a similar manner connected to the plates of an independent commutator, the segments or plates of which would be displaced with relation to those shown by an arc of forty-five degrees upon the armature-shaft. If the armature contained twelve bobbins, each set of four would be connected in a similar way to its independent commutator, which, together with its set of connected bobbins, would in this case be displaced from its neighboring set by an arc of thirty degrees, as will be readily understood.

In Fig. 2, 5 5 and 6 6 represent the double commutator-brushes of one commutator-cylinder, 5 5 being electrically connected to one another in the well-known way, and constituting, for instance, the negative brush, and 6 6 the positive brush. If the armature-coils A B C D thus connected to one another and to the commutator revolve between two curved pole-pieces of field-of-force magnets, the coils B D or A C will, when generating current at all, be generating currents of opposite polarity, and will be connected simultaneously to the opposite brushes, while either pair of bobbins—as, for instance, B D—is opposite the centers of the curved pole-extensions, and for a considerable portion of their movement in approaching and leaving that point the other pair, A C, will be cut out, the first pair only being connected to the outside circuit. As, however, each bobbin B D approaches the point where it will be cut out, and for a portion of its movement preceding that point, the bobbins A C, if the movement be in the direction of the arrow, will respectively be connected simultaneously with them to the brushes, the latter bobbins having during this portion of the revolution just left the neutral point and begun to generate useful current.

The lengths of time during which a single bobbin is connected to a brush and during which two contiguous bobbins are simultaneously connected to a brush obviously depend upon the length of the commutator-segments and the compass of the brushes. I find that good results are attained by constructing and proportioning the parts of the commutator so that each pair of opposite bobbins is in circuit alone during, say, forty-five degrees of revolution at the center of the arc of revolution opposite the field of force in which the current generated is taken off from the armature, two bobbins being connected simultaneously in the remaining portion of the arc. Under such a hypothesis it would be necessary to so construct the commutator that each segment should be connected to a commutator-brush through an arc of revolution of one hundred and thirty-five degrees. Each bobbin would then be in circuit only with its opposite bobbin in the central forty-five degrees of its circular path opposite the commutator-brushes. In the forty-five degrees preceding the central portion of the whole arc it would be connected simultaneously with the bobbin ahead of it to the commutator-brush. In the forty-five degrees following the central portion it would be connected simultaneously with its following bobbin. This will be readily seen from a mathematical consideration of the conditions. If the commutator be so constructed that a segment will be connected through a longer arc, the arc in which it and its joined bobbin will be connected to the outside circuit independently of the contiguous bobbins of the set will be shorter. I do not, however, limit myself to any particular proportions.

The relation of the bobbins to one another in the various positions of the armature will be readily understood from a consideration of the diagrams, the dotted curved lines indicating the curved pole-pieces and the arrow the direction of revolution.

In the operation of the machine it will be readily understood that the circuit of but a single pair of bobbins is broken at a time, and that it is practically impossible to interrupt the current generated in more than one bobbin at the same time, since it is impossible to so construct the parts that the opposite plates of the commutators shall leave their brushes at exactly the same moment. In practice, one will leave at an instant before the other; but the current from the bobbin whose plate remains for the instant connected is not broken at the same time, because its current finds a path through the common neutral connection to that bobbin of its set which is for the time being generating an opposite current. It will be observed, also, that with this arrangement of the bobbins the total current generated or supplied by the machine is never interrupted at the commutator, and the formation of large and injurious sparks is impossible.

In Fig. 4, I have shown the manner in which the independent sets of four are connected for supplying an intensity current. The positive and negative brushes of the separate commutators are indicated by the usual signs, + and —, and the positive brush of one commutator is connected to the negative brush of the next. By this arrangement I am enabled to greatly increase the efficiency of the machine in the practical operation of running a number of electric lamps. If quantity effects are desired, the two positive brushes are connected to one another, and also the two negative.

If desired, two brushes broad enough to cover both commutator-cylinders may be employed instead of the four brushes just described.

In Fig. 3 the plates of the commutator overlap one another, so that if single brushes be used instead of the double brushes shown in Fig. 2 contact will be made with a following plate before contact is broken with a preceding plate connected to the brush. The plates as thus extended by their overlapping portions are long enough to preserve the connection of their bobbins with the commutator during the proper extent of revolution of the armature.

My invention is readily applicable to existing forms of machine—such as the Gramme. In applying it to these machines as at present constructed I generally prefer to use two or more of their bobbins as a single bobbin, one end of the two connected bobbins being connected to the commutator-plate and the other to the common or neutral connection.

My invention may be also applied to machines of the Siemens type and to other constructions.

I do not limit myself to what are known as "dynamo electric machines" or "self-accumulators," as I may also apply my invention to that class of machines in which the field of force is maintained by permanent magnets, or by electro-magnets energized by a current independent of that generated in the armature. I may even include all the coils of the armature in the four separate bobbins, using of course only the one commutator-cylinder, with its four plates or segments. I generally prefer, however, to divide the coils into two or more sets of bobbins of four each.

What I claim as my invention is—

1. The combination, with four armature-bobbins within a magnetic field formed by a positive and negative pole-piece and disposed symmetrically with relation to one another within the limits of that field, of a commutator-cylinder provided with separate plates or segments, to which the same ends of the bobbins are separately connected, positive and negative collecting-brushes arranged, as described, so as to collect the two opposite currents simultaneously generated in all the four bobbins, or in two of them only, and supply the same to a single outside circuit, and a common electrical joint for the other ends of the four bobbins, substantially as described.

2. The combination, with the armature coils or bobbins of a dynamo-electric machine divided into groups of four bobbins disposed symmetrically with relation to one another, as described, of sets of commutator plates or segments, one set for each group, each set containing four plates or segments, electrical connections from one end of the bobbins of each group to the separate plates or segments of its commutator set, and a common electrical joint for the other ends of the bobbins.

3. The combination, substantially as described, with two or more sets of armature-bobbins, said bobbins being disposed symmetrically with relation to one another in sets of four, in the manner described, of two or more corresponding commutator-cylinders, to which the sets of bobbins are independently connected, two positive and negative collector-brushes for each commutator-cylinder, and electrical connections from the positive brush of one cylinder to the negative brush of another, substantially as and for the purpose described.

4. An armature for a dynamo-electric machine whose bobbins are divided into sets, each of which contains four bobbins, the bobbins of each set being disposed symmetrically with relation to one another within the circumferential space included by all the bobbins, and provided with independent connections to a commutator-cylinder having four independent sections or segments.

DANIEL A. SCHUYLER.

Witnesses:
H. C. TOWNSEND,
THOMAS TOOMEY.